United States Patent
Kornilovich et al.

(10) Patent No.: US 7,729,576 B2
(45) Date of Patent: Jun. 1, 2010

(54) MODULATED SIGNAL RESONATORS

(75) Inventors: Pavel Kornilovich, Corvallis, OR (US); Michael W. Cumbie, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/389,892

(22) Filed: Mar. 27, 2006

(65) Prior Publication Data

US 2007/0223859 A1    Sep. 27, 2007

(51) Int. Cl.
*G02B 6/26* (2006.01)
*G02B 6/42* (2006.01)

(52) U.S. Cl. .............................. 385/32; 385/15; 385/27; 385/30; 385/31

(58) Field of Classification Search ............... 385/1–10, 385/27–30, 32
See application file for complete search history.

(56) References Cited

U.S. PATENT DOCUMENTS

| | | | |
|---|---|---|---|
| 3,884,546 A | 5/1975 | Chu | |
| 3,884,553 A | 5/1975 | Graser, Jr. | |
| 4,707,061 A * | 11/1987 | McMahon | 385/24 |
| 6,522,794 B1 | 2/2003 | Bischel et al. | |
| 6,580,851 B1 * | 6/2003 | Vahala et al. | 385/30 |
| 6,636,668 B1 * | 10/2003 | Al-hemyari et al. | 385/40 |
| 6,665,476 B2 * | 12/2003 | Braun et al. | 385/50 |
| 6,674,415 B2 | 1/2004 | Nakamura et al. | |
| 7,113,663 B1 * | 9/2006 | Spoonhower et al. | 385/16 |
| 7,120,332 B1 * | 10/2006 | Spoonhower et al. | 385/25 |
| 7,174,064 B2 * | 2/2007 | Sayyah et al. | 385/15 |
| 2002/0076147 A1 * | 6/2002 | Cush et al. | 385/27 |
| 2004/0013355 A1 * | 1/2004 | Margalit | 385/27 |
| 2004/0090599 A1 | 5/2004 | Kowarz et al. | |
| 2004/0240782 A1 * | 12/2004 | de Almeida et al. | 385/27 |
| 2004/0263943 A1 | 12/2004 | Starkweather | |
| 2005/0078902 A1 * | 4/2005 | Beausoleil et al. | 385/1 |
| 2005/0111789 A1 * | 5/2005 | Hayes | 385/27 |

FOREIGN PATENT DOCUMENTS

WO    WO 01/96913    12/2001

OTHER PUBLICATIONS

Yoshihiro Akahane, Hich Q Photonic Nanocavity in a Two-Dimesional Photonic Crystal, Nature, Oct. 30, 2003, p. 944-947, vol. 425.

* cited by examiner

*Primary Examiner*—Rhonda S Peace

(57) ABSTRACT

Various embodiments and methods utilizing resonators that differently receive electromagnetic radiation from a modulated signal are disclosed.

23 Claims, 4 Drawing Sheets

MODULATED SIGNAL RESONATORS

BACKGROUND

Visual communication devices, such as indicators and displays, sometimes employ light emitting, light attenuating or light reflecting elements or pixels that are selectively activated to communicate information. Selective activation is sometimes performed with electrical transistors or other electrical switching devices. Such switching devices add cost and complexity.

DETAILED DESCRIPTION OF EXAMPLE EMBODIMENTS

Figure 1:
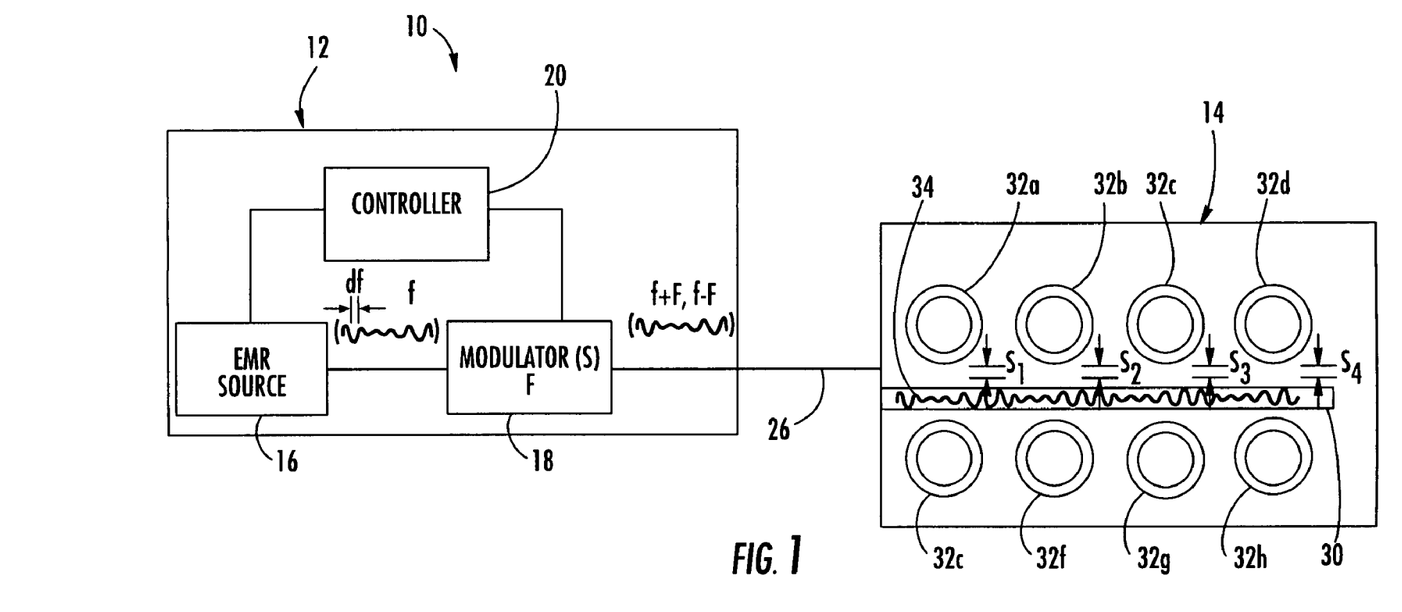
FIG. 1 is a schematic illustration of one example of a visual communication device according to an example embodiment.

FIG. 1 is a schematic illustration of one example of a visual communication device 10, such as a visual indicator or display. Device 10 is configured to communicate information to one or more observers. In one embodiment, device 10 is configured to communicate or indicate a status, level, amount, degree or other characteristic that is being sensed or monitored. In yet another embodiment, device 10 is configured to communicate an image which may include one or both of graphics and alpha-numeric symbols. As will be described hereafter, device 10 communicates such information with a reduced reliance upon electrical switching devices.

Communication device 10 generally includes signal generator 12 and resonation system 14. Signal generator 12 comprises a device configured to generate modulated electromagnetic radiation waves or signals. In particular, signal generator 12 is configured to modulate electromagnetic radiation so as to direct resonation or emission of the electromagnetic radiation by resonation system 14. In the example illustrated, signal generator 12 generally includes electromagnetic radiation source 16, one or more modulators 18 and controller 20. Electromagnetic radiation source 16 comprises a source of electromagnetic radiation. As schematically indicated in FIG. 1, in one embodiment, source 16 provides electromagnetic radiation having a frequency f with a spectral width df. The electromagnetic energy provided by source 16 is ultimately emitted or resonated by resonation system 14. According to one embodiment, source 16 may comprise a laser or other source of monochromatic visible light. In other embodiments, source 16 may alternatively be configured to provide other forms of electromagnetic radiation such as ultraviolet light or infrared light.

Modulator(s) 18 comprise one or more devices configured to modulate electromagnetic radiation supplied by source 16. In one embodiment in which source 16 supplies visible light, modulator(s) 18 comprise one or more electro-optical devices. In such an embodiment, modulators 18 employ a signal-controlled element to modulate a beam of light. The modulation may be imposed on one or more of the phase, frequency, amplitude, or direction of the modulated beam. In one embodiment, modulators 18 modulate a frequency of the electromagnetic radiation. In one embodiment, modulators 18 may comprise electrically-controlled modulators to provide modulation bandwidths into the gigahertz range. In other embodiments, modulators 18 may comprise other modulation devices.

Controller 20 comprises a processing unit configured to generate control signals for directing the provision of electromagnetic radiation by source 16 and for directing the modulation of the electromagnetic radiation by modulators 18. In other embodiments, source 16 may supply electromagnetic radiation without being under the direction of controller 20. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 36 is not limited to any specific combination of hardware circuitry and software, nor to any particular source for the instructions executed by the processing unit.

Controller 20 generates control signals so as to direct modulator(s) 18 to code an image, or other information to be visually communicated, in the frequencies and amplitudes of the resulting broadband optical signal provided by signal generator 12. In the particular example illustrated, controller 20 calculates a time-dependent profile for modulation of electromagnetic radiation from source 16 based upon the image or other data. According to one embodiment, the profile is calculated using an inverse Fourier transform, wherein control signals for modulators 18 are based upon the calculated profile. In other embodiments, controller 20 may calculate a time-dependent profile using other suitable wavelet transforms.

As shown in FIG. 1, in one embodiment, controller 20 generates control signals such that modulator(s) 18 modulate the electromagnetic radiation with a maximal characteristic frequency F. The resulting time-dependent electric field is: $E(t)=2*\cos(f*t)*\cos(F*t)=\cos((f+F)*T)+\cos((f-F)*t)$ and is a mixture of two frequencies: $f+F$ and $f-F$. In other words, modulator(s) 18 the central frequency f into two spectral lines. In such an embodiment, the monochromaticity M of source 16 ($f/df$) is greater than $f/F$ to avoid overlapping of the spectral lines. In one embodiment, wherein source 16 provides electromagnetic radiation having a central frequency f of $5 \cdot 10^{14}$ Hz, modulator(s) 18 have a modulation frequency F of $5 \cdot 10^{9}$ Hz.

In one embodiment, signal generation 12 may include multiple modulators 18, wherein controller 20 is configured to generate control signals directing such multiple modulators 18 to sequentially modulate the electromagnetic radiation or light to provide multiple frequencies. For example, in one embodiment, multiple modulators 18 may be utilized to provide electromagnetic radiation having frequencies f, f+/−F, f+/−2F, f+/−3F and so on. Such multiple frequencies facilitate selective activation of a corresponding number of distinct resonators as will be described hereafter.

Resonation system 14 comprises a system configured to selectively emit or resonate electromagnetic radiation at multiple locations or pixels in response to or based upon modulation of the electromagnetic radiation received from signal generator 12. According to one embodiment, resonation system 14 receives the modulated electromagnetic radiation carrier signal from signal generator 12 via transmission line 26. In one embodiment in which the electromagnetic radiation being transmitted in visible wavelengths of light, transmission line 26 may comprise an optical fiber or cable. In other embodiments, visible wavelengths of light may be transmitted through free space, such as with a laser beam. In yet other embodiments, other structures may be used to transmit the modulated electromagnetic carrier signal generated by signal generator 12.

Resonation system 14 generally includes waveguide 30 (schematically illustrated) and resonators 32a, 32b, 32c, 32d, 32e, 32f, 32h and 32g (schematically illustrated and collectively referred to as resonators 32). Waveguide 30 comprises a structure configured to transmit a modulated electromagnetic carrier signal or wave to resonators 32. In one embodiment, waveguide 30 is configured to provide a relatively high level of light transmission efficiency with reduced scattering or diffusion. In general, waveguide 30 is formed from one or more materials (sometimes referred to as the "core") having a first index of refraction, wherein the one or more materials surrounding or adjacent to waveguide 30 (sometimes referred to as the "cladding" or "cap") have a second lower index of refraction. In one embodiment in which waveguide 30 is configured to transmit visible wavelengths of light, the core of waveguide 30 is formed from a light transmissive or transparent material that is appropriately doped to enhance or raise the index of refraction of the core material(s) while the surrounding material or cladding is formed from the same undoped or lesser doped material(s). For example, in one embodiment, the core of waveguide 30 may be formed from $SiO_2$ which is doped with GeO, wherein the surrounding cladding is formed from $SiO_2$. In other embodiments, the core of waveguide 30 may be formed from $SiO_2$ while the cladding is formed from another material having a lower index of refraction such as $MgF_2$. In yet other embodiments, waveguide 30 may be formed from other materials. Although waveguide 30 is illustrated as being generally linear, in other embodiments, waveguide 30 may be nonlinear.

Resonators 32 comprise elements or structures configured to pull, withdraw or extract predetermined portions of the modulated electromagnetic carrier signal from waveguide 30 if such associated portions are present within waveguide 30. In effect, while waveguide 30 serves as a broadband signal transmitter, resonators 32 serve as narrow-pass filters. In the particular example illustrated, resonators 32 each have slightly different resonant frequencies such that at least two of resonators differently extract electromagnetic radiation from waveguide 38 on the modulated frequencies of the carrier signal being transmitted by waveguide 30. At least two of resonators 32 (sometimes referred to as "pixels") selectively extract a channel or frequency (Fourier) component of the electromagnetic radiation and illuminate or transmit such radiation for illumination or scattering. In such an embodiment, the amplitude of the frequency component extracted by the particular resonator 32 will determine the intensity of the radiation scattered by the resonator 32 or by a dedicated scattering device connected to resonator 32. For example, in one embodiment, resonator 32a may accept or receive electromagnetic radiation, such as light, from waveguide 30 having a first frequency component while resonator 32b may accept or receive the same electromagnetic radiation, such as light, from waveguide 30 having a second distinct frequency component. Because waveguide 30 transmits a modulated electromagnetic carrier signal having multiple frequencies, controller 20 may direct modulators 18 to appropriately modulate the electromagnetic energy from source 16 to selectively activate individual resonators 32 to emit electromagnetic radiation.

To distinguish between different frequency (Fourier) components of the electromagnetic radiation being transmitted by waveguide 30, resonators 32 have a sufficiently high quality factor Q (the energy-storing efficiency of a resonator) that is greater than f/F. According to one example embodiment, resonators 32 have a quality factor of at least about 100,000. In one embodiment wherein system 14 includes N resonators 32, source 16 and resonators 32 have monochromaticity M and quality Q, respectively, such that M,Q>(f*N)/F. In one embodiment, both M and Q are greater than 100,000*N.

In one embodiment, each resonator 32 comprises an endless loop of transparent or translucent material or materials, such as glass, plastic or other materials having an index of refraction greater than surrounding materials, wherein the geometry and dimensions of the loop defines what particular wavelengths and frequency of light are extracted or received by the particular resonator 32. In one embodiment, one or more resonators 32 may be are generally oval or ring-shaped. In yet other embodiments, resonators 32 may be stadium-shaped. In still other embodiments, resonators 32 may have other presently or future developed shapes and configurations that result in resonators 32 extracting particular frequency components of electromagnetic radiation from a carrier signal.

As shown by FIG. 1, resonators 32 are supported proximate to waveguide 30. Each resonator 32 is located sufficiently close to waveguide 30 so as to enable the resonator 32 to receive electromagnetic radiation, such as light, of a predetermined frequency or range of frequencies from waveguide 30. In particular, each resonator 32 is spaced from waveguide 30 by a gap having a dimension in a vicinity of the particular wavelength of electromagnetic radiation corresponding to the frequency that the particular resonator is configured to extract. For example, if one of resonators 32 is configured to extract or received a frequency component of the carrier signal provided by system 12 having a frequency and a corresponding wavelength of 500 nm, the particular pixel 32 is spaced from waveguide 30 also by less than approximately 500 nm. It is desirable to select the distance so that the energy transferred from the waveguide 30 to the resonator 32 is the greatest achievable for the particular embodiments of waveguide 30 and resonator 32 used .

In the example illustrated in FIG. 1, resonation system 14 includes multiple resonators 32 (resonators 32a, 32b, 32c, 32d, 32e, 32f, 32g and 32h) positioned along waveguide 30. Resonators 32a, 32b, 32c and 32d are each configured to receive or extract different frequency components from the carrier signal 34 being transmitted by waveguide 30. In particular, each of resonators 32 has different geometries and/or dimensions chosen such that different frequency components are extracted. In addition, each of resonators 32a, 32b, 32c and 32d are differently spaced from waveguide 30. In the example illustrated, resonators 32a, 32b, 32c and 32d are spaced from waveguide 30 by spacings S1, S2, S3 and S4, respectively. In one embodiment, spacings S1, S2, S3 and S4 may be 252 nm, 254 nm, 256 nm and 258 nm, respectively. In other embodiments, such spacings may have different values depending upon the particular frequency component to be extracted by the particular resonator 32.

Resonators 32e, 32f, 32g and 32h correspond to and extend generally opposite to resonators 32a, 32b, 32c and 32d. Resonators 32e, 32f, 32g and 32h extend on opposite sides of waveguide 30. As a result, the density of resonators 32 along waveguide 30 is increased, facilitating a shorter waveguide 30. In other embodiments, resonators 32e, 32f, 32g and 32h may extend on a common side of waveguide 30 as resonators 32a, 32b, 32c and. In the particular embodiment illustrated, resonators 32e, 32f, 32g and 32h are configured to extract the same frequency components as resonators 32a, 32b, 32c and 32d, respectively. In other embodiments, resonators 32e, 32f, 32g and 32h may alternatively be configured to extract different frequency components (or wavelengths). In one embodiment, the order in which resonators 32 are positioned along the waveguide 30 may correspond to the decreasing or increasing order of the respective resonant frequencies. In other embodiments, the order of resonators may be random.

In the example illustrated, resonators 32 are arranged in a two-dimensional array. As a result, resonation system 14 is well suited for providing an image. Although system 14 is illustrated as including two rows of resonators 32, in other embodiments, system 14 alternatively includes greater than two rows, wherein each row of resonators 32 or each pair of rows of resonators 32 has an associated waveguide 30 to provide a larger imaging area. In lieu of being arranged in rows, resonators 32 may be arranged in a nonlinear fashion along nonlinear waveguides 30. In still other embodiments, resonators 32 may be arranged in a single row. In such an embodiment, resonation system 14 may be well suited for serving as an indicator, wherein a level or degree may be indicated by either the number of resonators in the row emitting or extracting electromagnetic radiation, such as light, from waveguide 30 or by the particular resonator 32 that is emitting or extracting electromagnetic radiation. In other embodiments, one waveguide may be arranged in a zigzag fashion to cover a two-dimensional area.

In operation, according to one embodiment, signal generation system 12 provides modulated electromagnetic radiation having multiple frequency components. In particular, controller 20 generates control signals directing modulator 18 to modulate collector magnetic radiation provided by source 16. This modulated electromagnetic radiation is received by resonation system 14. The modulated electromagnetic radiation is transmitted by waveguide 30 along resonators 32. If a particular resonator 32 is configured to extract a frequency component included in the carrier signal that is presently being transmitted by waveguide 30, the particular resonator 32 will pull the frequency component from waveguide 30 and emit the extracted electromagnetic radiation.

According to one embodiment, electromagnetic radiation comprises visible light. As a result, resonators 32 emit or scatter the visible light to visibly communicate information. In other embodiments, other forms of electromagnetic radiation may be modulated and emitted by resonators 32, wherein the emitted electromagnetic radiation is used to trigger the provision of or otherwise provide visible light for communicating information. For example, in one embodiment, electromagnetic radiation may comprise ultraviolet light, wherein one or more structures, such as phosphors, are used to convert the emitted ultraviolet light to visible light. In other embodiments, electromagnetic radiation emitted by resonators 32 comprises non-visible light such as infrared or ultraviolet radiation.

Figure 2:
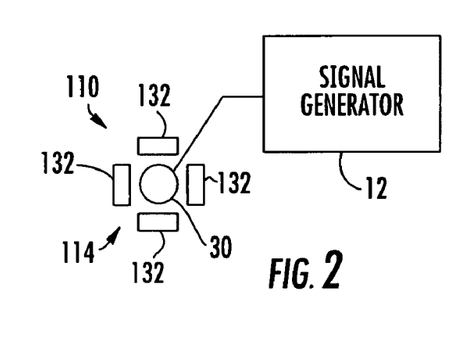
FIG. 2 is an end of view schematically illustrating another embodiment of the visual communication device of FIG. 1 according to an example embodiment.

FIG. 2 schematically illustrates visual communication device 110, another embodiment of visual communication device 10. Visual communication device 110 is similar to visual communication device 10 except that visual communication device 110 includes resonators 132 in lieu of resonators 32. Those remaining elements of device 110 which correspond to elements of device 10 are numbered similarly. Resonators 132 are similar to resonators 32 except the resonators 132 are supported along greater than two sides of waveguide 30. In the example illustrated, resonators 32 are arranged 360° about waveguide 30. In the example illustrated, four resonators 132 or four rows of resonators 132 are angularly positioned about waveguide 30. In other embodiments, greater or fewer than four resonators or four rows of resonators may be positioned about waveguide 30. In one embodiment, two or more of resonators 132 configured to extract different frequency components from one or more carrier signals transmitted by waveguide 30. In yet another embodiment in which resonator 132 are arranged in rows along waveguide 30, rows of a resonators 132 are configured to extract different frequency components from the carrier signal being transmitted by waveguide 30. As a result, resonation system 114, provided by waveguide 30 and resonators 132, provides a three-dimensional communication device for a visually communicating in a three-dimensional manner.

Figure 3:
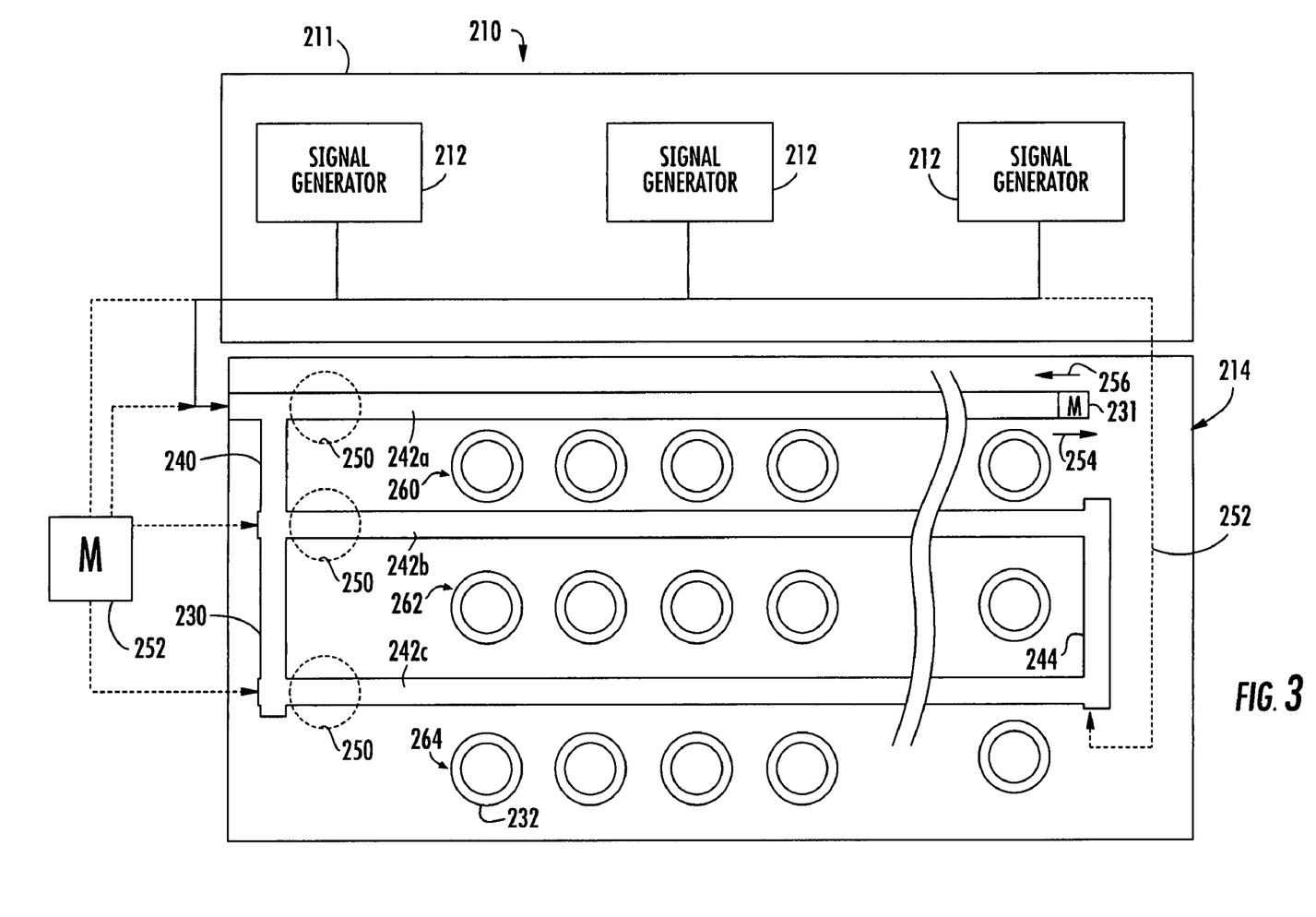
FIG. 3 is a schematic illustration of another embodiment of the visual communication device of FIG. 1 according to an example embodiment.

FIG. 3 schematically illustrates visual communication device 210, another embodiment of visual communication device 10. Visual communication device 210 generally includes signal generation system 211 and resonation system 214. Signal generation system 211 comprises a system configured to provide multiple modulated carrier signals so as to selectively control activation of portions of resonation system 214. Signal generation system 211 includes signal generators 212A, 212B and 212C (collectively referred to as signal generators 212). Each of signal generators 212 is substantially similar to signal generator 12 illustrated and described with respect to FIG. 1. In particular, each of signal generators 212 modulates electromagnetic radiation from a source to provide a modulated carrier signal having multiple frequency components. In one embodiment, each of signal generators 212 may have a separate and distinct controller 20 (shown in FIG. 1). In other embodiments, signal generation system 211 may alternatively employ a controller that generates control signals directing more than one of signal generators 212.

According to one embodiment, two or more of signal generators 212 include distinct electromagnetic radiation sources 16 (shown in FIG. 1) such that system 211 provides multiple carrier signals of different electromagnetic radiation bands. For example, in one embodiment, one of signal generators 212 may be configured to provide a modulated carrier signal comprising red light, one of signal generators 212 may be configured to provide a modulated carrier signal comprising green light and one of signal generators 212 may be configured to provide a modulated carrier signal comprising a blue light. In such an embodiment, because red light, green light and blue light may be combined to form other colors, device 210 and may provide a color image or a color indicator. In yet other embodiments, signal generators 212 may be configured to provide modulated carrier signals comprising other colors of light that may be combined to form yet other colors.

In still another embodiment, signal generators 212 may be configured to provide modulated carrier signals comprising different shades of a single color of light. For example, in one embodiment, one of signal generators 212 may be configured to provide a modulated carrier signal of light yellow light while another of signal generators 212 is configured to provide a modulated carrier signal of dark yellow light. Although signal generation system 211 is illustrated as including three signal generators 212, in other embodiments, some 211 may include fewer than three or greater than three such signal generators 212. In particular embodiments, system 211 may include multiple signal generators 212 configured to provide modulated carrier signals comprising different colors of light and multiple signal generators 212 providing modulated carrier signals comprising different shades of a single color of light.

Resonation system 214 comprises a system configured to receive the modulated carrier signals from signal generation system 211 and to selectively emit frequency components of the carrier signal to communicate information to an observer. Resonation system 214 includes waveguide 230, terminus 231 and resonators 232. Waveguide 230 transmits the modulated carrier signals from system 211 to resonators 232.

Waveguide 230 is similar to waveguide 30 except that waveguide 230 includes main guide 240, branch guides 242a, 242b and 242c (collectively referred to as branch guides 242) and connector guide 244. Main guide 240 receives the carrier signals from system 211 and presents such carrier signals to each of branch guides 242. Main guide 240 is generally formed from one or more materials configured to transmit electromagnetic radiation. In the embodiment illustrated, the main guide 240 is configured to transmit visible light. Main guides 240 have an index of refraction greater than that of surrounding material to more efficiently transmit such light. Although illustrated as being linear, main guide 240 may have other configurations.

Branch guides 242 extend from a main guide 240 and are configured to transmit electromagnetic radiation from main guide 242 to selected sets of adjacent resonators 232. In a particular example illustrated, branch guides 242 are differently tuned with different geometries, dimensions or materials to selectively receive predetermined ranges of wavelengths or ranges of frequency components from the carrier signals being transmitted by main guide 240. As a result, electromagnetic radiation, such as light, may be blocked prior to passing into a particular one of branch guides 242. Consequently, the efficiency of resonation system 214 may be greater in that light or other electromagnetic radiation does not travel along a branch guide 242 that extends adjacent resonators 232 not configured to accept or extract frequency components from the range of frequencies or wavelengths blocked by the particular branch guide 242.

As indicated in phantom in FIG. 3, in other embodiments, entrance points of each of branch guides 242 may additionally be provided with a wide band filter 250 configured to selectively block or selectively permit entry of particular ranges of wavelengths of electromagnetic radiation into the associated branch waveguide 242. In such an embodiment, branch waveguides 242 may alternatively be formed from a common transmissive material. Examples of wideband filters include thin-film dielectric Fabri-Perot resonators made of $SiO_2$ and $TiO_2$ layers.

As further indicated in phantom in FIG. 3, in still other embodiments, device 210 may include and electromagnetic radiation multiplexer 252. Multiplexer 252 selectively forwards ranges of frequencies or wavelengths to branch guides 242. One example of such a multiplexer 252 is CN 2150 passive optical multiplexer commercially available from Ciena in Linthicum, Maryland. In such an embodiment, branch waveguides 242 may alternatively be formed from a common transmissive material and wideband filters 250 may be omitted. In yet other embodiments, branch waveguides 242 may be formed from one or more materials configured to transmit the same ranges of frequencies or wavelengths, with wideband filters 250 and multiplexer 252 being omitted.

Connector guide 244 extends between and interconnects branch guides 242b and 242c. Guide 244 transmits light or other electromagnetic radiation between branch guides 242b and 242c. In those embodiments in which branch guides 242b and 242c are not differently tuned and in which filters 250 are omitted, connector guide 244 recirculates light or other electromagnetic radiation such that the light moves along those resonators 32 adjacent to branch guides 242b and 242c in two opposite directions, enhancing the light transmission efficiency of resonation system 214.

FIG. 3 further illustrates two additional structures or arrangements by which light or other electromagnetic radiation is transmitted along resonators 232 to increase the light emission efficiency. As indicated by broken lines 252, in particular embodiments, the modulated carrier signals from system 211 may additionally be directed or transmitted to another end of one or more of branch guides 242. This may be done by transmitting the modulated carrier signals through free space or through a transmission line, such as optical cable. As a result, modulated carrier signals pass resonators 232 while propagating in two opposite directions to enhance efficiency.

FIG. 3 also illustrates terminus 231. Terminus 231 comprises a highly reflective structure located proximate an end of branch guide 242a. Terminus 231 reflects light propagating through waveguide 242a in the direction indicated by arrow 254 such that the light is reflected in the direction indicated by arrow 256. The reflected light passes those resonators 232 along waveguide 242a once again to enhance efficiency. In one embodiment, reflective terminus 231 may comprise high-reflective metal layer or a multilayer dielectric stack (Bragg mirror). In still other embodiments, terminus 231 may be omitted.

Resonators 232 are substantially similar to resonators 232 except that some of resonators 232 are located so as to receive frequency components of modulated carrier signals being transmitted along and adjacent to two waveguides. In the example illustrated, row 260 of the resonators 32 is sufficiently close to both branch waveguide 242 and branch waveguide 242 so as to receive light or electromagnetic radiation from such branch waveguides if the waveguides are transmitting appropriate frequency components that match tuning of the resonators 232 in row 260. As a result, resonators 232 in row 260 may have increased emission intensity or duration than would likely be achieved without this configuration. Although rows 262 and 264 of resonators 232 are illustrated as being sufficiently close to single branch waveguides, in other embodiments, such rows 262 and 264 of resonators 232 may alternatively be located sufficiently close to more than one branch waveguide 242.

In operation, according to one embodiment, signal generators 212 of system 211 provide resonation system 214 with red, green and blue modulated light signals. The modulated carrier light signals have a time profile and appropriate frequency components so as to cause resonators 232 to individually receive red, green or blue light and to emit such light at appropriate times so as to form a two-dimensional image that is colored. Alternatively, the modulated signals from system 211 may be different shades of a single color such that the resulting image is formed by different shades of the single color. Because the selective activation of resonators 232 is controlled by the modulation of the light or other electromagnetic energy rather than by electrical switching devices, device 210 may have a reduced cost and complexity.

Figure 4:
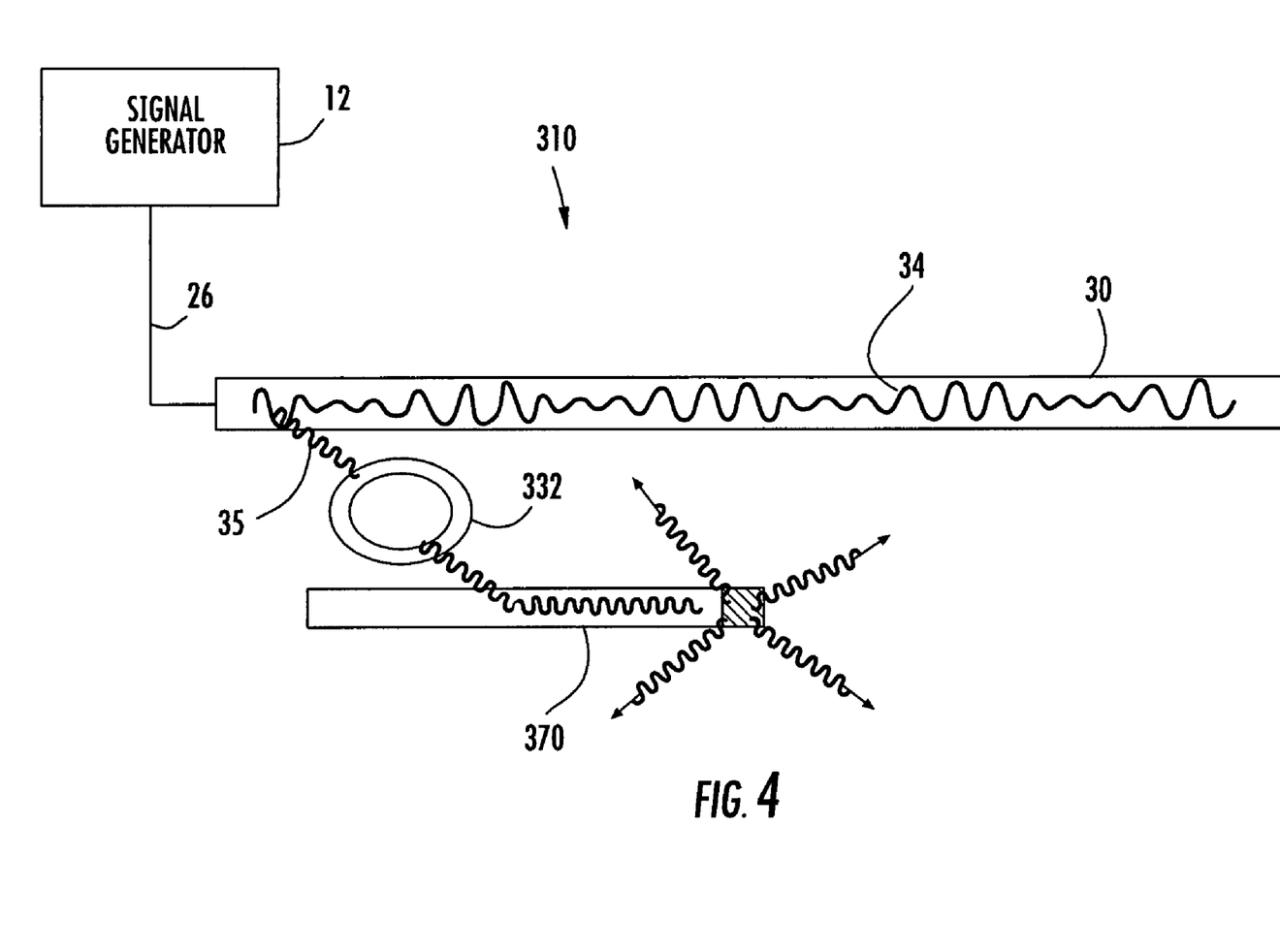
FIG. 4 is a schematic illustration of another embodiment of the visual communication device of FIG. 1 according to an example embodiment.

FIG. 4 schematically illustrates visual communication device 310, another embodiment of device 10. Device 310 is similar to device 10 except that device 310 includes resonators 332 (one of which is shown) in lieu of resonators 32 and diffusers 370 (one of which is shown). Those remaining elements of device 310 which correspond to elements of device 10 are numbered similarly. As schematically illustrated in FIG. 4, waveguide 30 transmits a carrier signal 34 to resonator 332. As schematically represented by line 35, resonators 332 selectively extract frequency components from carriers signal 34 as a result of the geometry and/or dimensions of resonator 332. However, unlike resonators 32, resonators 332 are configured so as to substantially transmit the extracted frequency component 35 to an associated diffuser 370 instead of diffusing or emitting the extracted frequency component 35.

Diffuser 370 comprises a relatively high efficiency diffusion or scattering structure or device operably coupled to resonator 332 so as to receive the extracted frequency component 35 from resonator 332. In one particular embodiment, diffuser 370 is spaced from resonator 332 by a spacing substantially similar to the wavelength of the extracted frequency component 35. As further illustrated by FIG. 4, diffuser 370 scatters the electromagnetic energy or light. Because diffuser 370 may be configured to have a greater scattering capability as compared to its associated resonator 332, the brightness of the image or indicator provided by device 310 may be enhanced. In one embodiment, diffuser 370 may comprise a rough $SiO_2$ surface. Although devices 10 and 210 are illustrated as having resonators that directly emit or and scatter light or other light to magnetic radiation, in alternative embodiments, devices 10 and 210 may additionally include diffusers associated with one or more of the resonators of devices 10 and 210.

Figure 5:
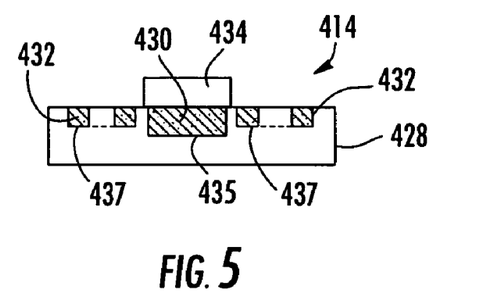
FIG. 5 is a sectional view schematically illustrating a resonation system according to an example embodiment.

FIG. 5 illustrates one example method of forming a resonation system 414, another embodiment of resonation systems 14,114 and 214 described above. As shown in FIG. 5, resonation system 414 includes substrate 428, waveguide 430, resonators 432 and cladding 434. Substrate 428 comprises a base or foundation supporting waveguide 430 and resonators 432. Waveguide 430 is formed upon substrate 428 and transmits modulated carrier signals provided by one or more signal generators to resonators 432. Resonators 432 are also formed upon and are supported by substrate 428 in close proximity with waveguide 430. Cladding 434 extends over and about waveguide 430. Waveguide 430 and resonators 432 each have a higher index of refraction as compared to substrate 428 and cladding 434. As a result, diffusion of light from waveguide 430 is reduced. In addition, light emitted by resonators 432 is directed in a direction away from substrate 428. In other embodiments, substrate 428 may alternatively have a greater relative index of refraction under the resonators, permitting light to be defused away from resonators 432 in an opposite direction.

According to one embodiment, resonation system 414 is formed by initially providing substrate 428 of a substantially uniform composition and thereafter selectively doping portions of substrate 428 to increase the index of refraction of the doped portions to form waveguide 430 and resonators 432. Cladding 434 is formed by forming a layer upon waveguide 430. In one embodiment, substrate 428 may comprise $SiO_2$, wherein waveguide 430 is formed by doping portions with GeO. In other embodiments, substrate 428 may comprise other materials and waveguide 430 and/or resonators 432 may be formed by doping substrate 428 in other fashions with other materials.

According to yet another embodiment, resonation system 414 may alternatively be formed by initially providing substrate 428 and using photolithography to form waveguide 430, resonators 432 and cladding 434. For example, in one embodiment, cavities 435 and 437 may be formed by selectively etching portions of substrate 428. Thereafter, one or more materials having a higher index of refraction may be applied in the cavities 435 and 437, such as by vapor deposition, sputtering and the like. Thereafter, cladding 434 may be selectively applied or applied in selectively etched way to provide cladding 434 over waveguide 430.

Figure 6:
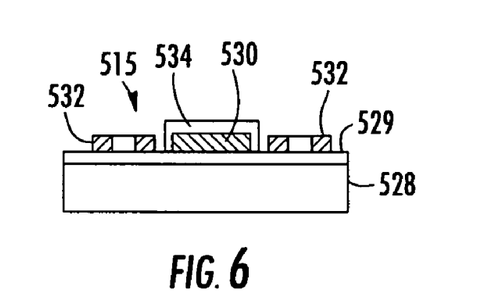
FIG. 6 is a sectional view schematically illustrating another embodiment of the resonation system of FIG. 5 according to an example embodiment.

FIG. 6 schematically illustrates resonation system 515, another embodiment of resonation system 14, resonation system 114 or resonation system 214. Resonation system 515 generally includes substrate 528, reflective layer 529, waveguide 530, resonators 532 and cladding 534. Substrate 528 is similar to substrate 428. Substrate 528 comprises a base or other structure supporting reflective layer 529, waveguide 530, resonators 532 and cladding 534. In one embodiment, substrate 528 may be formed from $SiO_2$. In other embodiments, substrate 528 may be formed from other materials.

Reflective layer 529 comprises a layer of material to reflect electromagnetic radiation such as visible light. Reflective layer 529 is formed upon some trait 528 between substrate 528 and resonators 532. Reflective layer 529 reflects and directs light (or other electromagnetic radiation) in a direction away from substrate 528. In one embodiment, reflective layer 529 may comprise a dielectric stack made of dissimilar materials such as $SiO_2$ and $TiO_2$. In another embodiment, reflective layer 529 may comprise a film of low-index material $MgF_2$. In other embodiments, reflective layer 529 may be formed from other materials or may be omitted.

Waveguide 530 and resonators 532 are similar to waveguide 430 and resonators 432. Waveguide 530 transmits modulated carrier signals to resonators 532. Resonators 532 selectively receive electromagnetic radiation or light based upon frequency components of the transmitted modulated carrier signals and scatter the received light. Cladding 534 comprises a layer of one or more materials having a lower index of refraction as compared to waveguide 530. Cladding 534 extends over waveguide 530 and inhibits diffusion of light from waveguide 530.

Figure 7:
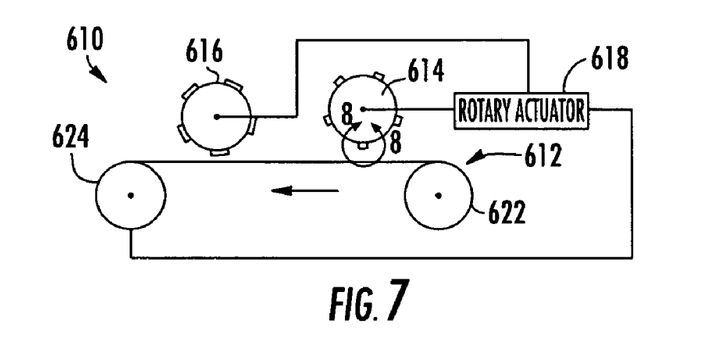
FIG. 7 is a schematic illustration of a fabrication system according to an example embodiment.
Figure 8:
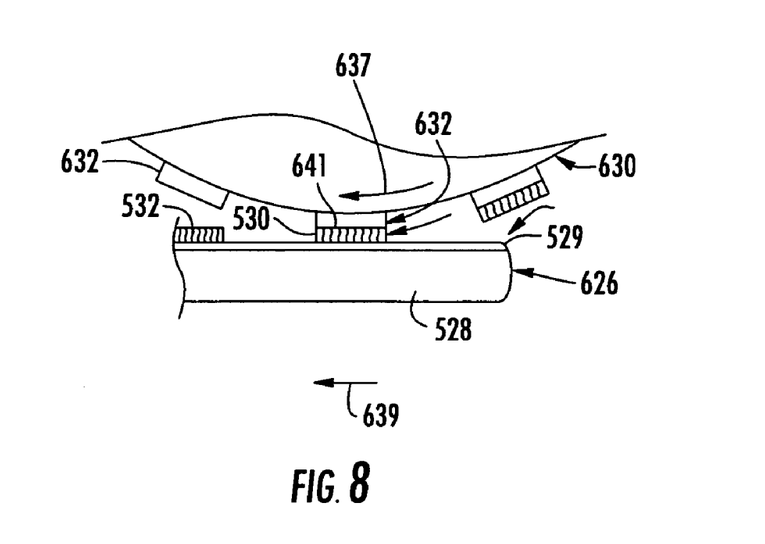
FIG. 8 enlarged fragmentary elevational view schematically illustrating the fabrication system of FIG. 5 forming the resonation system of FIG. 6 according to an example embodiment

FIGS. 7 and 8 schematically illustrate one method for forming resonation system 515. In particular, FIGS. 7 and 8 illustrate formation of resonation system 515 by embossing or micro-contact printing. As shown by FIG. 7, in one embodiment, resonation system 515 may be formed by fabrication system 610. Fabrication system 610 includes transport 612 contact printing station 614, contact printing station 616 and rotary actuator 618. Transport 612 includes a feed reel 622 and take-up reel 624. As shown by FIG. 8, feed reel 622 provides a web 626 of materials which includes substrate 528 and reflective layer 529 of resonation system 515. In other embodiments, feed reel 622 may alternatively provide substrate 528, wherein the reflective layer 529 is applied or otherwise formed upon substrate 528 by fabrication system 610. Take up reel 624 winds up the completed web forming resonation system 515.

Contact printing station 614 comprises one or more devices configured to contact print waveguide 530 and resonators 532 upon web 626. Likewise, contact printing station 616 comprises one or more device a contact print cladding 534 upon waveguide 530. In one particular embodiment, contact printing stations 614 and 616 comprise micro or nano contact printing stations. Stations 614 and 616 are each rotatably driven by rotary actuator 618 also rotatably drives take-up real 624. In other embodiments, station 614, 616 as well as take-up reel 624 may be rotatably driven by independent rotary actuators.

FIG. 8 illustrates contact printing station 614 imprinting resonators 532 and waveguide 530 upon web 626 in more detail. As shown by FIG. 8, station 614 includes support 630 and stamps 632. Support 630 maintains positioning of stamps 632 relative to web 626. Stamps 632 comprises raised portions sufficiently resilient so as to be brought into conformal contact with web 626, as support 630 is rotated in the direction indicated by arrow 637 and as web 626 is moved in the direction indicated by arrow 639, so as to deposit materials 641 upon web 626 to form waveguide 530 and resonators 532. Because waveguide 530 and resonators 532 are formed by contact printing, enhanced control over the size, shape and relative positioning of waveguide 530 and the resonators 532 is achieved at a relatively lower-cost.

FIGS. 7 and 8 illustrate one example of a process for forming resonation system 515. Other processes may also be employed. For example, in other embodiments, contact printing station 616 may be omitted where cladding 534 is applied in other fashions. Moreover, to facilitate the formation of waveguide 530 and resonators 532, additional micro contact printing stations may also be employed to selectively apply wetting or non-wetting agents to web 626 prior to applying materials that form waveguide 530 or resonators 532.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a first series of resonators each of which is configured to resonate a characteristic electromagnetic radiation, wherein at least two of the resonators are configured to receive and resonate different characteristic electromagnetic radiation; and
   a first waveguide for delivering a modulated signal to each of said resonators, wherein each resonator receives and resonates at least one particular component of said modulated signal corresponding to the characteristic electromagnetic radiation of that resonator;
   a frequency modulator for outputting said modulated signal comprising frequency modulations; and
   a diffuser coupled to one or more of the resonators.

2. The apparatus of claim 1, wherein the resonators are arranged in a two-dimensional array with a plurality of resonators in each dimension.

3. The apparatus of claim 1, wherein the electromagnetic radiation is visible.

4. The apparatus of claim 1, wherein the resonators are configured to substantially emit the radiation received towards a viewer.

5. The apparatus of claim 1, wherein at least two resonators have different shapes or different dimensions.

6. The apparatus of claim 1 wherein the waveguide has a reflective axial terminus.

7. The apparatus of claim 6, wherein the at least two of the resonators are differently spaced from the waveguide.

8. The apparatus of claim 1 further comprising:
   a second series of resonators; and
   a second waveguide coupled to the second series of resonators.

9. The apparatus of claim 8, wherein the first waveguide and the second waveguide are configured to differently receive electromagnetic radiation from the modulated signal based upon modulation of the modulated signal.

10. The apparatus of claim 9 further comprising a multiplexer configured to selectively transmit the modulated signal to the first waveguide or the second waveguide.

11. The apparatus of claim 9 further comprising a wide band filter coupled to the first waveguide and configured to selectively transmit the modulated signal to the first waveguide.

12. The apparatus of claim 1 further comprising a waveguide coupled to the first series of resonators, the waveguide having a first end configured to receive a first carrier signal and a second end configured to receive a second carrier signal or the first carrier signal.

13. The apparatus of claim 1 further comprising at least one frequency modulator including said frequency modulator and configured to modulate a first carrier signal consisting of red light to form the modulated signal, a second carrier signal consisting of blue light to form a second modulated signal and a third carrier signal consisting of green light to form a third modulated signal.

14. The apparatus of claim 1 further comprising at least one frequency modulator including said frequency modulator and configured to modulate a first carrier signal consisting of a first shade of a first color of light to form the modulated signal and a second carrier signal consisting of a second shade of the first color of light to form a second modulated signal.

15. The apparatus of claim 1, wherein the characteristic electromagnetic radiation comprises visible light, wherein the first series of resonators are provided as part of a display panel having a plurality of pixels that emit the visible light to form an image and wherein the modulator is configured to modulate the signal for the plurality of the pixels.

16. The apparatus of claim 1 and comprising a second waveguide wherein one of the resonators is configured to receive electromagnetic radiation from both the first waveguide and the second waveguide.

17. The apparatus of claim 1, wherein the resonators are arranged in a two-dimensional array having a plurality of resonators in each dimension and wherein the two-dimensional array of resonators are passive in that each of the resonators is configured to at all times extract a single fixed frequency component of the modulated signal.

18. An apparatus comprising:
   means for frequency modulating visible light based upon image data;
   means for selectively resonating specific components of said modulated visible light based upon frequency modulation of the light and emitting said resonating light; and
   a diffuser coupled to said means for selectively resonating.

19. A method comprising:
   forming a series of resonators proximate a waveguide in a two-dimensional array with a plurality of resonators in each direction, at least two of the resonators configured to receive and resonate different components of a frequency modulated signal propagating in said waveguide, wherein a component of said modulated signal received and resonated by a particular resonator corresponds to a characteristic electromagnetic radiation of that resonator; and coupling a diffuser to one or more of the resonators in said series of resonators.

20. The method of claim 19 wherein the resonators are formed by at least one of a group of fabrication steps consisting of: doping, photolithography and contact printing.

21. An apparatus comprising:

a first series of resonators each of which is configured to resonate a characteristic electromagnetic radiation, wherein at least two of the resonators are configured to receive and resonate different characteristic electromagnetic radiation; and a first waveguide for delivering a modulated signal to each of said resonators, wherein each resonator receives and resonates at least one particular component of said modulated signal corresponding to the characteristic electromagnetic radiation of that resonator;

a frequency modulator for outputting said modulated signal comprising frequency modulations;

a second series of resonators; and a second waveguide coupled to the second series of resonators, wherein the first waveguide and the second waveguide are configured to differently receive electromagnetic radiation from the modulated signal based upon modulation of the modulated signal.

22. The apparatus of claim 21 further comprising a multiplexer configured to selectively transmit the modulated signal to the first waveguide or the second waveguide.

23. The apparatus of claim 22 further comprising a wide band filter coupled to the first waveguide and configured to selectively transmit the modulated signal to the first waveguide.

* * * * *

UNITED STATES PATENT AND TRADEMARK OFFICE
CERTIFICATE OF CORRECTION

PATENT NO. : 7,729,576 B2  Page 1 of 1
APPLICATION NO. : 11/389892
DATED : June 1, 2010
INVENTOR(S) : Pavel Kornilovich et al.

It is certified that error appears in the above-identified patent and that said Letters Patent is hereby corrected as shown below:

In column 1, line 33, after "FIG. 8" insert -- is an --.

In column 2, line 59, after "18" insert -- split --.

In column 3, line 62, after "38" insert -- based --.

In column 10, line 67, after "618" insert -- which --.

Signed and Sealed this

Twenty-sixth Day of October, 2010

David J. Kappos
*Director of the United States Patent and Trademark Office*